United States Patent
Shaubi et al.

(10) Patent No.: US 12,361,531 B2
(45) Date of Patent: Jul. 15, 2025

(54) MACHINE LEARNING-BASED CLASSIFICATION OF DEFECTS IN A SEMICONDUCTOR SPECIMEN

(71) Applicant: APPLIED MATERIALS ISRAEL LTD., Rehovot (IL)

(72) Inventors: Ohad Shaubi, Yavne (IL); Boaz Cohen, Lehavim (IL); Kirill Savchenko, Lod (IL); Ore Shtalrid, Yavne (IL)

(73) Assignee: Applied Materials Israel Ltd., Rehovot (IL)

( * ) Notice: Subject to any disclaimer, the term of this patent is extended or adjusted under 35 U.S.C. 154(b) by 360 days.

(21) Appl. No.: 17/605,217

(22) PCT Filed: Mar. 24, 2020

(86) PCT No.: PCT/IL2020/050350
§ 371 (c)(1),
(2) Date: Oct. 20, 2021

(87) PCT Pub. No.: WO2020/234863
PCT Pub. Date: Nov. 26, 2020

(65) Prior Publication Data
US 2022/0222806 A1    Jul. 14, 2022

Related U.S. Application Data

(60) Provisional application No. 62/851,449, filed on May 22, 2019.

(51) Int. Cl.
*G06T 7/00*    (2017.01)
*G06V 10/44*    (2022.01)
(Continued)

(52) U.S. Cl.
CPC .......... *G06T 7/0004* (2013.01); *G06V 10/454* (2022.01); *G06V 10/764* (2022.01);
(Continued)

(58) Field of Classification Search
CPC ......... G06T 7/0004; G06T 2207/30148; G06T 7/0002; G06T 2207/20081;
(Continued)

(56) References Cited

U.S. PATENT DOCUMENTS

| 5,544,256 A | 8/1996 | Brecher et al. |
| 6,205,239 B1 | 3/2001 | Lin et al. |

(Continued)

FOREIGN PATENT DOCUMENTS

| CN | 103310235 A | 9/2013 |
| CN | 107220668 A | 9/2017 |

(Continued)

OTHER PUBLICATIONS

S. Cheon, H. Lee, C. O. Kim and S. H. Lee, "Convolutional Neural Network for Wafer Surface Defect Classification and the Detection of Unknown Defect Class," in IEEE Transactions on Semiconductor Manufacturing, vol. 32, No. 2, pp. 163-170, May 2019, doi: 10.1109/TSM.2019.2902657 (Year: 2019).*

(Continued)

*Primary Examiner* — Andrew M Moyer
*Assistant Examiner* — Ahmed A Nasher
(74) *Attorney, Agent, or Firm* — Lowenstein Sandler LLP (57) ABSTRACT

There is provided a method of automated defects' classification, and a system thereof. The method comprises obtaining data informative of a set of defects' physical attributes usable to distinguish between defects of different classes among the plurality of classes; training a first machine learning model to generate, for the given defect, a multi-label output vector informative of values of the physical (Continued)

attributes, thereby generating for the given defect a multi-label descriptor; and using the trained first machine learning model to generate multi-label descriptors of the defects in the specimen. The method can further comprise obtaining data informative of multi-label data sets, each data set being uniquely indicative of a respective class of the plurality of classes and comprising a unique set of values of the physical attributes; and classifying defects in the specimen by matching respectively generated multi-label descriptors of the defects to the multi-label data sets.

18 Claims, 3 Drawing Sheets

(51) Int. Cl.
*G06V 10/764* (2022.01)
*G06V 10/774* (2022.01)
*G06V 10/776* (2022.01)
*G06V 10/82* (2022.01)

(52) U.S. Cl.
CPC .......... *G06V 10/774* (2022.01); *G06V 10/776* (2022.01); *G06V 10/82* (2022.01); *G06T 2207/20081* (2013.01); *G06T 2207/30148* (2013.01)

(58) Field of Classification Search
CPC . G06T 2207/20084; G06T 2207/10061; G06T 7/11; G06V 2201/06; G06V 10/764; G06V 10/454; G06V 10/774; G06F 18/2431
See application file for complete search history.

(56) References Cited

U.S. PATENT DOCUMENTS

| | | | |
|---|---|---|---|
| 10,267,748 B2* | 4/2019 | Plihal | G01N 21/55 |
| 11,199,506 B2 | 12/2021 | Shaubi et al. | |
| 2008/0192992 A1 | 8/2008 | Moshe | |
| 2016/0358041 A1 | 12/2016 | Venkataraman et al. | |
| 2017/0177997 A1 | 6/2017 | Karlinsky et al. | |
| 2018/0060702 A1* | 3/2018 | Ma | G06V 10/764 |
| 2019/0096053 A1 | 3/2019 | Asbag et al. | |
| 2019/0108396 A1* | 4/2019 | Dal Mutto | G06V 20/52 |
| 2019/0139210 A1* | 5/2019 | Kondo | G06V 10/772 |
| 2019/0272628 A1* | 9/2019 | Tsou | G06V 10/82 |

FOREIGN PATENT DOCUMENTS

| | | |
|---|---|---|
| CN | 109215364 A | 1/2019 |
| CN | 109325443 A | 2/2019 |
| WO | 2019155471 | 8/2019 |

OTHER PUBLICATIONS

Brukhim, Nataly et al., "Predict and Constrain: Modeling Cardinality in Deep Structured Prediction", published on Feb. 13, 2018, arXiv:1802.04721v1; https://arxiv.org/pdf/1802.04721.

PCT International Search Report and Written Opinion for International Application No. PCT/IL2020/050350, mailed Aug. 6, 2020, 11 pages.

* cited by examiner

MACHINE LEARNING-BASED CLASSIFICATION OF DEFECTS IN A SEMICONDUCTOR SPECIMEN

TECHNICAL FIELD

The presently disclosed subject matter relates, in general, to the field of examination of a specimen, and more specifically, to automating the classification of defects in a specimen.

BACKGROUND

Current demands for high density and performance associated with ultra large scale integration of fabricated devices require submicron features, increased transistor and circuit speeds, and improved reliability. Such demands require formation of device features with high precision and uniformity, which, in turn, necessitates careful monitoring of the fabrication process, including automated examination of the devices while they are still in the form of semiconductor wafers.

The term "specimen" used in this specification should be expansively construed to cover any kind of wafer, masks, and other structures, combinations and/or parts thereof used for manufacturing semiconductor integrated circuits, magnetic heads, flat panel displays, and other semiconductor-fabricated articles.

The term "examination" used in this specification should be expansively construed to cover any kind of metrology-related operations as well as operations related to detection and/or classification of defects in a specimen during its fabrication. Examination is provided by using non-destructive examination tools during or after manufacture of the specimen to be examined. By way of non-limiting example, the examination process can include runtime scanning (in a single or in multiple scans), sampling, reviewing, measuring, classifying and/or other operations provided with regard to the specimen or parts thereof using the same or different inspection tools. Likewise, examination can be provided prior to manufacture of the specimen to be examined, and can include, for example, generating an examination recipe(s) and/or other setup operations. It is noted that, unless specifically stated otherwise, the term "examination" or its derivatives used in this specification, are not limited with respect to resolution or size of an inspection area. A variety of non-destructive examination tools includes, by way of non-limiting example, scanning electron microscopes, atomic force microscopes, optical inspection tools, etc.

By way of non-limiting example, run-time examination can employ a two phase procedure, e.g. inspection of a specimen followed by review of sampled locations of potential defects. During the first phase, the surface of a specimen is inspected at high-speed and relatively low-resolution. In the first phase, a defect map is produced to show suspected locations on the specimen having high probability of a defect. During the second phase, at least part of the suspected locations are more thoroughly analyzed with relatively high resolution. In some cases, both phases can be implemented by the same inspection tool, and, in some other cases, these two phases are implemented by different inspection tools.

Examination processes are used at various steps during semiconductor fabrication to detect and classify defects on specimens. Effectiveness of examination can be increased by automatization of process(es) as, for example, Automatic Defect Classification (ADC), Automatic Defect Review (ADR), etc.

GENERAL DESCRIPTION

In accordance with certain aspects of the presently disclosed subject matter, there is provided a method of automated classifying defects in a semiconductor specimen into a plurality of classes. The method by a processing and memory, circuitry (PMC) and comprises: obtaining data informative of a set of defects' physical attributes usable to distinguish between defects of different classes among the plurality of classes; and upon training a first machine learning model to process a sample comprising one or more images informative of a given defect so to generate for the given defect a multi-label output vector informative of values of the physical attributes from the set of physical attributes, thereby generating for the given defect a multi-label descriptor, using the trained first machine learning model to generate multi-label descriptors of the defects in the specimen, the descriptors being usable for classification.

The method can further comprise: obtaining data informative of multi-label data sets, each data set being uniquely indicative of a respective class of the plurality of classes and comprising a unique set of values of physical attributes from the set of physical attributes; and upon training a second machine learning model to provide a multi-label classification, using the trained second machine learning model to classify defects in the specimen by matching respectively generated multi-label descriptors of the defects to the multi-label data sets. Alternatively or additionally, the generated multi-label descriptors of the defects in the specimen can be analyzed to recognize multi-modal behavior of one or more classes and/or to recognize new repeating multi-label data sets, thereby identifying new classes of the defects.

In accordance with other aspects of the presently disclosed subject matter, there is provided a system to classify defects in a semiconductor specimen into a plurality of classes. The system comprises a processing and memory circuitry (PMC) operatively connected to an input interface, wherein the input interface is configured to receive samples comprising images informative of the defects; and wherein the PMC is configured: to obtain data informative of a set of defects' physical attributes usable to distinguish between defects of different classes among the plurality of classes; and upon training a first machine learning model to process a sample comprising one or more images informative of a given defect so to generate for the given defect a multi-label output vector informative of values of the physical attributes from the set of physical attributes, thereby generating for the given defect a multi-label descriptor, to use the trained first machine learning model to generate multi-label descriptors of the defects in the specimen, the descriptors being usable for classification.

The PMC can be further configured: to obtain data informative of multi-label data sets, each data set being uniquely indicative of a respective class of the plurality of classes and comprising a unique set of values of the physical attributes from the set of physical attributes; and upon training a second machine learning model to provide a multi-label classification, to use the trained second machine learning model for classifying defects in the specimen by matching respectively generated multi-label descriptors of the defects to the multi-label data sets.

The PMC can be further configured to: obtain data informative of multi-label data sets, each data set being uniquely indicative of a respective class of the plurality of classes and comprising a unique set of values of the physical attributes from the set of physical attributes; and analyze the generated multi-label descriptors of the defects in the specimen to recognize new repeating multi-label data sets, thereby identifying new classes of the defects and/or recognize multi-modal behavior of one or more classes by analyzing the generated multi-label descriptors of the defects in the specimen and/or recognize new repeating multi-label data sets, thereby identifying new classes of the defects.

In accordance with further aspects and, optionally, in combination with other aspects of the presently disclosed subject matter, classifying a defect can include defining a certainty threshold as a ratio between a number of values in the respectively generated multi-label descriptor that match to a given class and the total number of values in the multi-label data set indicative of the given class. By way of non-limiting example, the certainty threshold can enable at least one of: optimizing of confidence levels of defects classification; identifying misclassified defects; setting purity requirements separately for each class and/or group of classes; setting accuracy requirements separately for each class and/or group of classes; and setting extraction requirements separately for each class and/or group of classes.

In accordance with further aspects and, optionally, in combination with other aspects of the presently disclosed subject matter, the physical attributes in the set of the defects' physical attributes can be informative of at least one of: physical location, shape, perimeter, sidewall angle, aspect ratio, orientation, symmetry, layer, texture, edges and chemical composition.

By way of non-limiting example, the plurality of classes can comprise a "particle" class and a "bridge" class, wherein the respective set of defects' physical attributes can comprise roughness of texture, clearness of edges, position in relation to a top of a pattern, and position in relation to two patterns.

In accordance with further aspects and, optionally, in combination with other aspects of the presently disclosed subject matter, the values of the physical attributes in the multi-label descriptors and the multi-label data sets can be binary. Alternatively, the values of the physical attributes in the multi-label descriptors and the multi-label data sets can correspond to "Yes", "No" and "Not relevant" with regard to respective physical attributes.

Among advantages of certain embodiments of the presently disclosed subject matter is capability of classifying defects using learned attributes with physical meaning, thus enabling physical understanding and debugging, whilst with high performance intrinsic for learned attributes.

Among further advantages of certain embodiments of the presently disclosed subject matter is capability of classification to unseen classes by defining such classes by attributes with physical meaning.

BRIEF DESCRIPTION OF THE DRAWINGS

In order to understand the invention and to see how it may be carried out in practice, embodiments will now be described, by way of non-limiting example only, with reference to the accompanying drawings, in which.

DETAILED DESCRIPTION OF EMBODIMENTS

In the following detailed description, numerous specific details are set forth in order to provide a thorough understanding of the invention. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "processing", "computing", "representing", "comparing", "generating", "training", or the like, refer to the action(s) and/or process(es) of a computer that manipulate and/or transform data into other data, said data represented as physical, such as electronic, quantities and/or said data representing the physical objects. The term "computer" should be expansively construed to cover any kind of hardware-based electronic device with data processing capabilities including, by way of non-limiting example, a FPEI (Fabrication Process Examination Information) system and respective parts thereof disclosed in the present application.

The terms "non-transitory memory" and "non-transitory storage medium" used herein should be expansively construed to cover any volatile or non-volatile computer memory suitable to the presently disclosed subject matter.

The term "defect" used in this specification should be expansively construed to cover any kind of abnormality or undesirable feature formed on or within a specimen.

The term "design data" used in the specification should be expansively construed to cover any data indicative of hierarchical physical design (layout) of a specimen. Design data can be provided by a respective designer and/or can be derived from the physical design (e.g. through complex simulation, simple geometric and Boolean operations, etc.). Design data can be provided in different formats as, by of non-limiting examples, GDSII format, OASIS format, etc. Design data can be presented in vector format, grayscale intensity image format, or otherwise.

It is appreciated that, unless specifically stated otherwise, certain features of the presently disclosed subject matter, which are described in the context of separate embodiments, can also be provided in combination in a single embodiment. Conversely, various features of the presently disclosed subject matter, which are described in the context of a single embodiment, can also be provided separately or in any suitable sub-combination. In the following detailed description, numerous specific details are set forth in order to provide a thorough understanding of the methods and apparatus.

Figure 1:
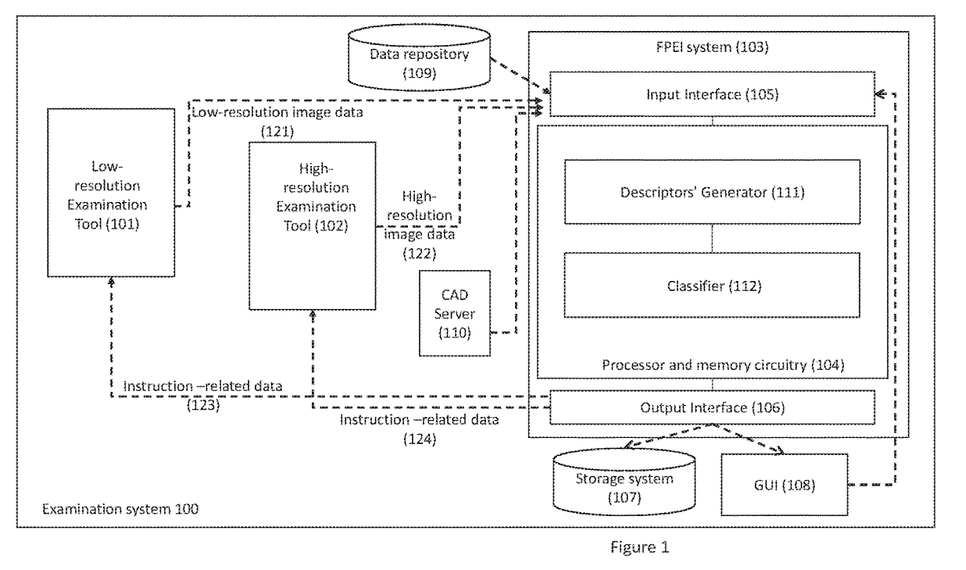
FIG. 1 illustrates a functional block diagram of an examination system in accordance with certain embodiments of the presently disclosed subject matter.

Bearing this in mind, attention is drawn to FIG. 1 illustrating a functional block diagram of an examination system in accordance with certain embodiments of the presently disclosed subject matter. The examination system 100 illustrated in FIG. 1 can be used for examination of a specimen (e.g. of a wafer and/or parts thereof) as part of the specimen fabrication process. The illustrated examination system 100 comprises computer-based system 103 capable of automatically determining metrology-related and/or defect-related information using images obtained during specimen fabrication. Such images are referred to hereinafter as fabrication process (FP) images. The system 103 is referred to hereinafter as an FPEI (Fabrication Process Examination Information) system. FPEI system 103 can be operatively connected to one or more low-resolution examination tools 101 and/or one or more high-resolution examination tools 102 and/or other examination tools. The examination tools are configured to capture FP images and/or to review the captured FP image(s) and/or to enable or provide measurements related to the captured image(s). The FPEI system can be further operatively connected to CAD server 110 and data repository 109.

FPEI system 103 comprises a processor and memory circuitry (PMC) 104 operatively connected to a hardware-based input interface 105 and to a hardware-based output interface 106. PMC 104 is configured to provide all processing necessary for operating FPEI system, as further detailed with reference to FIGS. 2-3 and comprises a processor (not shown separately) and a memory (not shown separately). The processor of PMC 104 can be configured to execute several functional modules in accordance with computer-readable instructions implemented on a non-transitory computer-readable memory comprised in the PMC. Such functional modules are referred to hereinafter as comprised in the PMC. Functional modules comprised in PMC 104 include operatively connected Machine Learning Module for descriptors' generation 111 (referred to hereinafter as a Descriptors' Generator) and Machine Learning Module for defects' classification 112 (referred to hereinafter as a Classifier).

Operation of FPEI system 103, PMC 104 and the functional blocks therein will be further detailed with reference to FIGS. 2-3.

As will be further detailed with reference to FIGS. 2-3, FPEI system is configured to receive, via input interface 105, FP input data. FP input data can include data (and/or derivatives thereof and/or metadata associated therewith) produced by the examination tools and/or data produced and/or stored in one or more data repositories 109 and/or in CAD server 110 and/or another relevant data depository. It is noted that FP input data can include images (e.g. captured images, images derived from the captured images, simulated images, synthetic images, etc.) and associated numeric data (e.g. metadata, hand-crafted attributes, etc.). It is further noted that image data can include data related to a layer of interest and/or to one or more other layers of the specimen. Optionally, for training purposes, FP input data can include the entire available FAB data or part thereof selected in accordance with certain criteria.

FPEI system is further configured to process at least part of the received FP input data and send, via output interface 106, the results (or part thereof) to a storage system 107, to examination tool(s), to a computer-based graphical user interface (GUI) 108 for rendering the results and/or to external systems (e.g. Yield Management System (YMS) of a FAB). GUI 108 can be further configured to enable user-specified inputs related to operating FPEI system 103.

By way of non-limiting example, a specimen can be examined by one or more low-resolution examination machines 101 (e.g. an optical inspection system, low-resolution SEM, etc.). The resulting data (referred to hereinafter as low-resolution image data 121), informative of low-resolution images of the specimen, can be transmitted—directly or via one or more intermediate systems—to FPEI system 103. Alternatively or additionally, the specimen can be examined by a high-resolution machine 102 (e.g. a subset of potential defect locations selected for review can be reviewed by a scanning electron microscope (SEM) or Atomic Force Microscopy (AFM)). The resulting data (referred to hereinafter as high-resolution image data 122), informative of high-resolution images of the specimen, can be transmitted—directly or via one or more intermediate systems—to FPEI system 103.

It is noted that images of a desired location on a specimen can be captured at different resolutions. By way of non-limiting example, so-called "defect images" of the desired location are usable to distinguish between a defect and a false alarm, while so-called "class images" of the desired location are obtained with higher resolution and are usable for defect classification. In some embodiments, images of the same location (with the same or different resolutions) can comprise several images registered therebetween (e.g. images captured from the given location and one or more reference images corresponding to the given location).

Upon processing the FP input data (e.g. low-resolution image data and/or high-resolution image data, optionally together with other data, as, for example, design data, synthetic data, etc.), FPEI system can send the results (e.g. instruction-related data 123 and/or 124) to any of the examination tool(s), store the results (e.g. defect attributes, defect classification, etc.) in storage system 107, render the results via GUI 108 and/or send them to an external system (e.g. to YMS).

Those versed in the art will readily appreciate that the teachings of the presently disclosed subject matter are not bound by the system illustrated in FIG. 1; equivalent and/or modified functionality can be consolidated or divided in another manner and can be implemented in any appropriate combination of software with firmware and/or hardware.

Without limiting the scope of the disclosure in any way, it should also be noted that the examination tools can be implemented as inspection machines of various types, such as optical imaging machines, electron beam inspection machines and so on. In some cases the same examination tool can provide low-resolution image data and high-resolution image data. In some cases at least one examination tool can have metrology capabilities.

Descriptors' Generator 111 and Classifier 112 can be implemented as separate or combined Machine Learning Modules. For purpose of illustration only, the following description is provided for Machine Learning Modules (Descriptors' Generator 111 and Classifier 112) implemented as Deep Neural Networks (DNNs). Those skilled in the art will readily appreciate that the teachings of the presently disclosed subject matter are, likewise, applicable to other suitable techniques based on Machine Learning.

Descriptors' Generator 111 and Classifier 112 can comprise one or more DNN subnetworks each comprising a plurality of layers organized in accordance with the respective DNN architecture. Optionally, at least one of the DNN networks can have an architecture different from the others. By way of non-limiting example, the layers in respective DNN networks can be organized in accordance with Convolutional Neural Network (CNN) architecture, Recurrent Neural Network architecture, Recursive Neural Networks architecture, or otherwise. Optionally, at least part of the DNN subnetworks can have one or more common layers (e.g. final fuse layer, output full-connected layers, etc.). Output of Descriptors' Generator 111 can serve as input for Classifier 112.

Each layer of a DNN network can include multiple basic computational elements (CE) typically referred to in the art as dimensions, neurons, or nodes. Computational elements of a given layer can be connected with CEs of a preceding layer and/or a subsequent layer. Each connection between the CE of a preceding layer and the CE of a subsequent layer is associated with a weighting value. A given CE can receive inputs from CEs of a previous layer via the respective connections, each given connection being associated with a weighting value which can be applied to the input of the given connection. The weighting values can determine the relative strength of the connections and thus the relative influence of the respective inputs on the output of the given CE. The given CE can be configured to compute an activation value (e.g. the weighted sum of the inputs) and further derive an output by applying an activation function to the computed activation. The activation function can be, for example, an identity function, a deterministic function (e.g., linear, sigmoid, threshold, or the like), a stochastic function, or other suitable function. The output from the given CE can be transmitted to CEs of a subsequent layer via the respective connections. Likewise, as above, each connection at the output of a CE can be associated with a weighting value which can be applied to the output of the CE prior to being received as an input of a CE of a subsequent layer. Further to the weighting values, there can be threshold values (including limiting functions) associated with the connections and CEs.

The weighting and/or threshold values of a deep neural network can be initially selected prior to training, and can be further iteratively adjusted or modified during training to achieve an optimal set of weighting and/or threshold values in the trained DNN module. After each iteration, a difference can be determined between the actual output produced by DNN module and the target output associated with the respective training set of data. The difference can be referred to as an error value. Training can be determined to be complete when a cost function indicative of the error value is less than a predetermined value or when a limited change in performance between iterations is achieved. Descriptors' Generator 111 can be trained separately of Classifier 112. A set of input data used to train a respective machine learning model is referred to hereinafter as a training set. For DNN, the training set is used to adjust the weights/thresholds of the deep neural network.

It is noted that the teachings of the presently disclosed subject matter are not bound by the architecture of Descriptors' Generator 111 and Classifier 112 (including the number and/or architecture of DNN networks). By way of non-limiting example, Classifier 112 can operate in a manner disclosed in PCT application PCT/IL2019/050155 filed on Feb. 7, 2019 incorporated herewith by reference in its entirety.

It is noted that the examination system illustrated in FIG. 1 can be implemented in a distributed computing environment, in which the aforementioned functional modules shown in FIG. 1 can be distributed over several local and/or remote devices, and can be linked through a communication network. It is further noted that in other embodiments at least part of examination tools 101 and/or 102, data repositories 109, storage system 107 and/or GUI 108 can be external to the examination system 100 and operate in data communication with FPEI system 103 via input interface 105 and output interface 106. FPEI system 103 can be implemented as stand-alone computer(s) to be used in conjunction with the examination tools. Alternatively, the respective functions of the FPEI system can, at least partly, the integrated with one or more examination tools.

Figure 2:
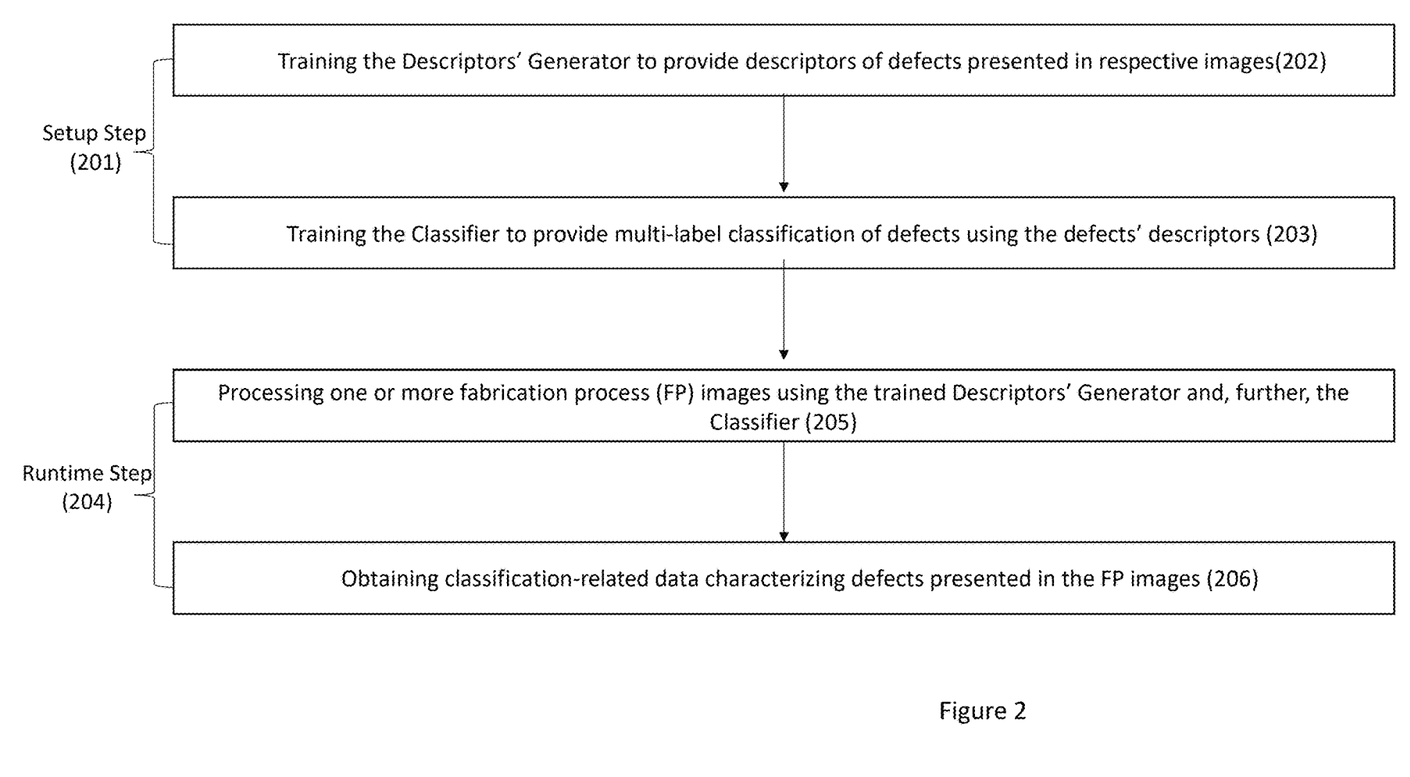
FIG. 2 illustrates a generalized flow-chart of machine learning-based classification of defects in accordance with certain embodiments of the presently disclosed subject matter.

Referring to FIG. 2, there is illustrated a generalized flow-chart of machine learning-based classification in accordance with certain embodiments of the presently disclosed subject matter. The process includes a setup step (201) comprising training (202) Descriptors' Generator 111 to provide class-related descriptors for defects in respective images and training (203) Classifier 112 to provide multi-label classification of defects based on the respective descriptors. The setup step is further detailed with reference to FIG. 3.

During the runtime (204), the PMC of FPEI system uses the obtained trained Descriptors' Generator 111 and Classifier 112 to process (205) a FP sample comprising one or more FP images. Thereby PMC obtains (206) classification-related data characterizing at least one of the images in the processed FP sample. When processing one or more FP images, PMC can also use predefined parameters and/or parameters received from other sources in addition to the training-based parameters characterizing Descriptors' Generator 111 and Classifier 112 upon training.

FP images in the FP sample can arrive from different examination modalities (e.g. from different examination tools, from different channels of the same examination tool as, for example, bright field and dark field images, from the same examination tool using different operational parameters, or can be derived from design data, etc.).

For example, FP images can be selected from images of the specimen (e.g. the wafer or parts thereof) captured during the manufacturing process, derivatives of the captured images obtained by various pre-processing stages (e.g. images of a part of a wafer or a photomask captured by SEM or an optical inspection system, SEM images roughly centered around the defect to be classified by ADC. SEM images of larger regions in which the defect is to be localized by ADR, registered images of different examination modalities corresponding to the same mask location, segmented images, height map images, etc.), computer-generated design data-based images, etc. It is noted that FP images can comprise the images of a layer of interest and/or registered images of one or more other layers of the specimen. FP images of different layers are referred to hereinafter also as images received from the different modalities.

It is noted that in embodiments of the presently disclosed subject matter, characteristics of the images comprised in FP samples and/or corresponding training samples, differ from the regular RGB images used in the general Deep Neural Networks known in the art. For example, electron based imaging results in greyscale images with various effects as non-uniform noise distribution, charging effects, large variability between sensors (different tools), and more. Further, the SEM image is usually composed of 5 different grey scale images, each image corresponding to a different perspective from which the image was taken (Top, Left, Right, Up, Down).

It is further noted that FP samples and/or corresponding training samples and/or can include multiple data types of FP input data, such as, for example, images of different origin and resolution defect images, class images, reference images, CAD images, etc.), different types of numeric data, as, for example, different types of data derived from the images (e.g. height map, defect mask, grades, segmentations, etc.), different types of metadata (e.g. imaging conditions, pixel-size, etc.), different types of hand-crafted attributes (e.g. defect size, orientation, background segment, etc.), and alike. The defects of a given class may arrive from one or more layers and/or one or more products in the FAB. A training set can be further enriched to include augmented and/or synthetic defects. By way of non-limiting example, a training set can be enriched, as detailed in PCT Application No. PCT/IL2019/050150 filed on Feb. 7, 2019 and incorporated herewith by reference in its entirety, and U.S. application Ser. No. 16/280,869 filed on Feb. 20, 2019 and incorporated herewith by reference in its entirety, etc.

Figure 3:
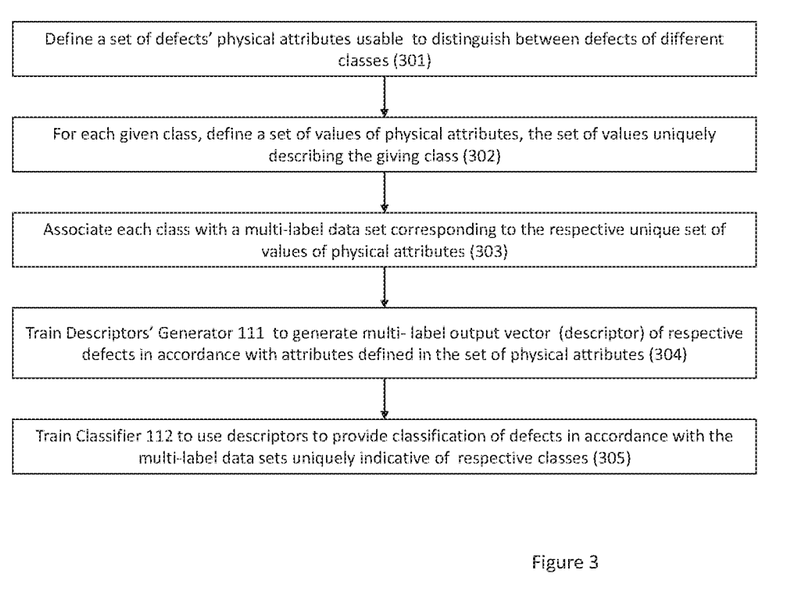
FIG. 3 illustrates a generalized flow-chart of a setup step for classifying defects in accordance with certain embodiments of the presently disclosed subject matter.

Referring to FIG. 3, there is illustrated a generalized flow-chart of setup step (201). In accordance with certain embodiments of the presently disclosed subject matter, the setup step includes defining (301) a set of defects' physical attributes (e.g. up to 20-30 physical attributes) usable to distinguish between defects of different classes and further defining (302), for each given class, a set of values of these physical attributes, the set of values uniquely describing the giving class. Accordingly, each class is uniquely associated (303) with a multi-label data set corresponding to the respective unique set of values of physical attributes characterizing defects in the given class. Operations (301)-(303) can be provided per product, per customer, and/or globally for a group of products/customers and respective unique association of classes with multi-label data sets can be stored in PMC 104. Operations (301)-(303) can be provided manually or, at least partly, by a computer.

By way of non-limiting example, the physical attributes can characterize physical location, shape, perimeter, sidewall angle, aspect ratio, orientation, symmetry, etc. Likewise, physical attributes can characterize location of a defect on certain one or more layers, chemical composition (e.g. missing and/or presence of a certain material), etc. The values of physical attributes are derivable from the images in FP samples and/or respective training samples (e.g. by processing the images and/or derivatives thereof).

For example, a defect in a "particle" class can be characterized by a rough texture (small z variations of defect area) with clear edges which lie on top of the pattern, while a defect in a "bridge" class can be characterized by a non-rough texture without clear edges which connect two patterns, and lies on top. Thus, for these two classes, the set of defects' physical attributes can be defined as follows:
roughness of texture
clearness of edges
position in relation to the top of a pattern
position in relation to two patterns Optionally, but not necessary so, the values of physical attributes can be defined in a binary form. Table 1 presents a non-limiting example of a set of binary values of physical attributes uniquely describing "particle" and "bridge" classes of defects.

TABLE 1

|  | Is the texture of the defect rough? | Are the edges clear? | Does defect lie on top of a pattern? | Does defect connect two patterns? |
|---|---|---|---|---|
| Particle | 1 | 1 | 1 | 0 |
| Bridge | 0 | 0 | 1 | 1 |

Accordingly, for the above example, "Particle" class can be uniquely associated with multi-label binary data set [1 1 1 0] and "Bridge" class can be uniquely associated with multi-label binary data set [0 0 1 1].

It is noted that some attributes from the set of physical attributes can be not relevant for a specific defect class. Optionally, but not necessary so, the values of physical attributes can be defined as "Yes", "No" and "Not Relevant".

PMC 104 trains Descriptors' Generator 111 to generate (304), for each given defect, a multi-label output vector (referred to hereinafter also as "descriptor") it) defining the values of attributes from the set of physical attributes. By way of non-limiting example, the training procedure can be provided in a "structured prediction" manner (e.g. detailed in the article "Predict and Constrain: Modeling Cardinality in Deep Structured Prediction", Nataly Brukhiin and Amir Globerson, published on Feb. 13, 2018, arXiv: 1802.04721v1; https://arxiv.org/pdf. 802.04721.pdf. The article is incorporated herewith by reference in its entirety).

Alternatively or additionally, PMC 104 uses data sets uniquely associated with respective classes to train Classifier 112 to provide (305) classification of defects in accordance with the multi-label output vectors (descriptors).

The training process yields the trained Descriptors' Generator and the trained Classifier.

Referring back to FIG. 2, during runtime PMC 104 uses the trained Descriptors' Generator to process a FP sample to obtain a descriptor informative of physical attributes of a respective defect, and further uses the trained Classifier to classify the defect in accordance with multi-label data sets uniquely associated with respective classes.

Classifying can include also a certainty procedure defining a certainty threshold as a ratio between a number of values matching to a given class, to the total number of attribute values in the multi-label data set. Such a certainty threshold enables optimization of confidence levels of defects classification, and identifying misclassified defects. By way of non-limiting example, such a threshold can be implemented in a technique of classifying defects comprising assigning each class to a classification group among three or more classification groups with different priorities and further setting purity, accuracy and/or extraction requirements separately for each class, and optimizing the classification results in accordance with per-class requirements. The technique is disclosed in US Application No. 2019/0096053 incorporated herewith by reference in its entirety.

Analyses of the generated descriptors can recognize new repeating attribute patterns, thereby enabling to detect new classes initially not included in the classification. Likewise, such analyses enables recognizing multi-modal behavior of one or more classes and defining respective sub-classes (e.g. corresponding to different clusters of attributes's values characterizing the same class).

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

It will also be understood that the system according to the invention may be, at least partly, implemented on a suitably programmed computer. Likewise, the invention contemplates a computer program being readable by a computer for executing the method of the invention. The invention further contemplates a non-transitory computer-readable memory tangibly embodying a program of instructions executable by the computer for executing the method of the invention.

Those skilled in the art will readily appreciate that various modifications and changes can be applied to the embodiments of the invention as hereinbefore described without departing from its scope, defined in and by the appended claims.

What is claimed is:

1. A method of automated classifying defects in a semiconductor specimen into a plurality of classes, the method comprising, by a processing and memory circuitry (PMC):
obtaining a set of physical attributes of the defects usable to distinguish between defects of different classes among the plurality of classes;
obtaining data informative of a plurality of multi-label data sets, each multi-label data set of the plurality of multi-label data sets being uniquely indicative of a respective class of the plurality of classes and comprising a unique set of a plurality of respective values of corresponding physical attributes from the set of physical attributes characterizing the respective class, the plurality of respective values serving as a plurality of labels for each defect in the respective class; and
training a first machine learning model, using the data, to process a sample comprising one or more images informative of a given defect so to generate for the given defect a multi-label output vector informative of a plurality of respective values of corresponding physical attributes from the set of physical attributes characterizing the given defect, thereby generating a multi-label descriptor for the given defect.

2. The method of claim 1 further comprising, by the PMC:
training a second machine learning model, using the data, to provide a multi-label classification for the given defect.

3. The method of claim 2, wherein providing a multi-label classification of the given defect includes defining a certainty threshold as a ratio between a number of values in the multi-label descriptor that match to a given class and a total number of values in the multi-label data set indicative of the given class.

4. The method of claim 3 further comprising using the certainty threshold to enable at least one of:
a. optimizing of confidence levels of defects classification;
b. identifying misclassified defects;
c. setting purity requirements separately for each class and/or group of classes;
d. setting accuracy requirements separately for each class and/or group of classes; and
e. setting extraction requirements separately for each class and/or group of classes.

5. The method of claim 1, wherein the physical attributes in the set of physical attributes of the defects are informative of at least one of: physical location, shape, perimeter, sidewall angle, aspect ratio, orientation, symmetry, layer, texture, edges and chemical composition.

6. The method of claim 1, wherein the plurality of classes comprises a "particle" class and a "bridge" class, and wherein the set of defects' physical attributes comprises roughness of texture, clearness of edges, position in relation to a top of a pattern, and position in relation to two patterns.

7. The method of claim 2, wherein the values of the physical attributes in the multi-label descriptors and the multi-label data sets are binary.

8. The method of claim 2, wherein the values of the physical attributes in the multi-label descriptors and the multi-label data sets correspond to "Yes", "No" and "Not relevant" with regard to respective physical attributes.

9. A system to classify defects in a semiconductor specimen into a plurality of classes, the system comprising a processing and memory circuitry (PMC) operatively connected to an input interface, wherein the input interface is configured to receive samples comprising images informative of the defects; and wherein the PMC is configured to:
use a trained first machine learning model to generate multi-label descriptors of the defects in the semiconductor specimen, the multi-label descriptors being usable for classification,
wherein the first machine learning model is previously trained using data informative of a plurality of multi-label data sets, each multi-label data set of the plurality of multi-label data sets being uniquely indicative of a respective class of the plurality of classes, and comprising a unique set of a plurality of respective values of corresponding physical attributes from a set of physical attributes of the defects characterizing the respective class, the plurality of respective values serving as a plurality of labels of each defect in the respective class, the first machine learning model trained to process a sample comprising one or more images informative of a given defect so to generate for the given defect a multi-label output vector informative of a plurality of respective values of corresponding physical attributes from the set of physical attributes characterizing the given defect, thereby generating a multi-label descriptor for the given defect.

10. The system of claim 9, wherein the PMC is further configured to:
upon training a second machine learning model to provide a multi-label classification, use the trained second machine learning model for classifying the defects in the semiconductor specimen by matching respectively generated multi-label descriptors of the defects to the multi-label data sets.

11. The system of claim 9, wherein the PMC is further configured to:
analyze the generated multi-label descriptors of the defects in the semiconductor specimen to recognize new repeating multi-label data sets, thereby identifying new classes of the defects.

12. The system of claim 9, wherein the PMC is further configured to recognize multi-modal behavior of one or more classes by analyzing the generated multi-label descriptors of the defects in the specimen.

13. The system of claim 10, wherein classifying a defect of the defects in the semiconductor specimen includes defining a certainty threshold as a ratio between a number of values in the multi-label descriptor that match to a given class and a total number of values in the multi-label data set indicative of the given class.

14. The system of claim 13, wherein the PMC is further configured to use the certainty threshold to enable at least one of:
a. optimizing of confidence levels of defects classification;
b. identifying misclassified defects;
c. setting purity requirements separately for each class and/or group of classes;
d. setting accuracy requirements separately for each class and/or group of classes; and
e. setting extraction requirements separately for each class and/or group of classes.

15. The system of claim 9, wherein the physical attributes in the set of physical attributes of the defects are informative of at least one of: physical location, shape, perimeter, sidewall angle, aspect ratio, orientation, symmetry, layer, texture, edges and chemical composition.

16. The system of claim 9, wherein the plurality of classes comprises a "particle" class and a "bridge" class, and wherein the set of defects' physical attributes comprises roughness of texture, clearness of edges, position in relation to a top of a pattern, and position in relation to two patterns.

17. A non-transitory computer readable medium comprising instructions that, when executed by a computer, cause the computer to perform a method of classifying defects in a semiconductor specimen into a plurality of classes, the method comprising:

using a trained first machine learning model to generate multi-label descriptors of the defects in the semiconductor specimen, the multi-label descriptors being usable for classification, wherein the first machine learning model is previously trained using data informative of a plurality of multi-label data sets, each multi-label data set of the plurality of multi-label data sets being uniquely indicative of a respective class of the plurality of classes, and comprising a unique set of a plurality of respective values of corresponding physical attributes from a set of physical attributes of the defects characterizing the respective class, the plurality of respective values serving as a plurality of labels of each defect in the respective class, the first machine learning model trained to process a sample comprising one or more images informative of a given defect so to generate for the given defect a multi-label output vector informative of a plurality of respective values of corresponding physical attributes from the set of physical attributes characterizing the given defect, thereby generating a multi-label descriptor for the given defect.

18. The non-transitory computer readable medium of claim 17, wherein the method further comprises:

upon training a second machine learning model to provide a multi-label classification, using the trained second machine learning model to classify the defects in the semiconductor specimen by matching respectively generated multi-label descriptors of the defects to the multi-label data sets.

* * * * *